UNITED STATES PATENT OFFICE 2,776,952
Patented Jan. 8, 1957

2,776,952

IMPROVEMENTS IN THE PRODUCTION OF POLYMERIZATION PRODUCTS USING HALOGEN COMPOUNDS TO INCREASE THE EFFECTIVENESS OF SULFONE POLYMERIZATION CATALYSTS

Hellmut Bredereck, Erich Bäder, Wolfgang Nübling, and Adolf Wohnhas, Stuttgart, Germany, assignors to W. C. Heraeus G. m. b. H., Hanau (Main), Germany, a body corporate of Germany, and Deutsche Gold- und Silber-Scheideanstalt vormals Roessler, Frankfurt, Germany, a body corporate of Germany No Drawing. Application October 31, 1952,
Serial No. 318,092

Claims priority, application Germany November 3, 1951

6 Claims. (Cl. 260—80)

This invention relates to a process for increasing the effectiveness of catalysts in the manufacture of polymerisation products.

A series of substances, for example sulphones, have already been proposed as catalysts for the polymerisation of unsaturated organic compounds. In particular aryl sulphonalkylamines or aryl sulphonalkanolamines, in which at least one hydrogen atom on the nitrogen atom is substituted by a residue of the following formula:

in which R' represents hydrogen or a hydrocarbon residue which may, if desired, be substituted, the two different radicals R' being the same or different, have recently been proposed as being excellent polymerisation accelerators.

The following are examples of such substances: di-(p-toluene-sulphon-methyl)-methylamine

di - (p - toluene - sulphon - methyl) - amine

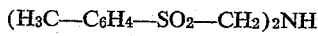

di-(p-toluene-sulphon-methyl)-ethylamine

and p - toluene - sulphon - methyl - (ethyl, phenyl) - amine

It has now surprisingly been found that the effectiveness of polymerisation accelerators, preferably sulphones, especially the highly effective sulphones of the above-defined type, can be further considerably increased by the addition of halogen compounds containing halogen atoms which are not firmly bound.

This is particularly true of compounds with ionically linked halogen, i. e. above all hydrogen halide acids and their salts and preferably organic compounds containing halogen atoms which are not firmly bound. These organic compounds include, for example, the addition compounds of hydrogen halide acids, especially the addition compounds of hydrochloric acid with organic bases, and also substances which contain a halogen atom, especially a chlorine atom, loosely bound to a carbon atom or a hetero atom, such for example as triphenylchlormethane, acetyl chloride and benzene sulphochloride. On the other hand, no particular results are obtained by adding substances containing a chlorine atom firmly bound to carbon, such as methylene chloride, chloroform, carbon tetrachloride, chlorobenzene, ethyl bromide, allyl bromide and trichlorethylene, unless indeed these substances are contaminated during their manufacture or in some other way with hydrogen chloride or other substances containing halogen atoms which are not firmly bound.

The quantitative proportions which the sulphones, especially the above-mentioned arylsulphonalkylamines and arylsulphonalkanolamines, bear to the added halogen compounds can be selected within wide limits. Preferably the halogen compounds are employed in considerably smaller proportion than the sulphones. Whereas the sulphones are added, for example in accordance with the former proposal, in quantities of a few tenths of one percent to a few percent calculated on the monomer, it is sufficient to add the halogen compounds in proportions of a few gamma to a few hundred gamma per cubic centimetre of liquid. Because of this difference in proportion the halogen compounds may be regarded as "activators" for the sulphones which act as catalysts. Since the effectiveness of the catalysts is substantially increased by these activators, it is possible to use smaller quantities of the catalyst than hitherto.

The increase in the polymerisation-accelerating action of the sulphones on addition of small quantities of halogen-containing compounds is particularly noticeable when hydroxyl-containing organic compounds are simultaneously present. For this reason alcohols, especially primary and secondary alcohols, are preferably added to the starting materials for carrying out the polymerisation of the invention. Generally low molecular weight monohydric or polyhydric alcohols, such as methanol, ethanol, propyl alcohol, isopropyl alcohol or glycerin, suffice. Preferably the hydroxyl-containing substances are so selected that they dissolve or swell in the monomeric material to be polymerised. Generally the added hydroxyl compounds need not be present in a molar ratio to the remaining components; generally additions of 1 to 15% suffice, and often even smaller proportions.

Finally, it has often proved advantageous to add to the system also small proportions, for example a few gamma per cubic centimetre of monomeric liquid, of heavy metal salts, especially copper salts. The action of the new catalyst system in accelerating polymerisation is so marked that it proves useful above all for polymerisation at relatively low temperatures, for example from room temperature to 50° C.; in this case it is not necessary to initiate the reaction by supplying heat, i. e. by a heat impulse. As is known, polymerisation at low temperatures has proved of importance in dental technique since it enables prothetic work and fillings to be carried out in the patient's mouth at the temperature of the body by using products known as self-hardening synthetic resin masses.

Preferably the process is carried out by subjecting the monomeric or only partially polymerised liquid to polymerisation is admixture with a powder which has already been completely polymerised. The addition of the solid polymer reduces the contraction in volume which the liquid experiences on being completely polymerised and thus gives a moulded body which is particularly true to shape. In accordance with a previous proposal, the pulverulent polymer is preferably used for this purpose in a particle size between $10\mu$ and $800\mu$, especially between $30\mu$ and $500\mu$. Powders produced by emulsion polymerisation or suspension polymerisation, and preferably powders having particles of regular shape, have proved particularly effective. In particular polymers which have not reached the maximum degree of polymerisation, i. e. polymers, the mean molecular weight of which could have been further increased during their production, have also proved particularly effective. The nature of the mixture which, for example, is to be filled into a gypsum mould or the cavity of a tooth and is there to be completely polymerised can be varied within wide limits in dependence on the ratio in which powder and liquid are mixed and on the additional substances employed, so that, for example, one can use masses of the nature of a viscous liquid or doughy mixtures or mixtures which can be regarded as wetted powders.

In carrying out the process of the invention it is generally advisable to add the solid sulphones which act as polymerisation accelerators to the pulverulent polymer, and to add to the liquid to be polymerised the halogen compounds which are employed as activators in gamma proportions only. This ensures that no undesired complete polymerisation of the monomeric liquid takes place before the preparations are employed. If desired, also solid and stable halogen compounds can be admixed with the powder which is to be completely polymerised or can be applied to the powder by washing the powder with a solution of the halogen compound in methyl alcohol or another solvent.

The new catalyst systems have proved particularly effective for the polymerisation of organic compounds with a doubly linked terminal methylene group, for example unsaturated hydrocarbons of aliphatic or aromatic nature, derivatives of vinyl alcohol and other compounds containing a vinyl group, acrylic acid and alkyl acrylic acids, for example methyl methacrylate, and derivatives and substitution products of these compounds, allyl compounds and numerous other substances. In these cases the chemical composition of the monomer must not be the same as that of the monomeric starting material from which the already polymerised purverulent component has been prepared, although in a preferred embodiment of the invention the main component of the monomeric liquid is methyl methacrylate and the main component of the powder is a polymer of methyl methacrylate. In many cases it is advantageous for the monomer to be already partially polymerised, i. e. for the liquid to contain already certain components of high molecular weight. Copolymers derived from various starting materials, for example a mixture of polymerised methyl methacrylate and butyl methacrylate or butyl acrylate, have proved suitable for the already completely polymerised powder.

The improvement to be obtained by means of the invention will further be described below with reference to examples taken from various groups of halogen compounds. In order to obtain at least a rough comparison of the effectiveness of the various halogen compounds, the experiments described below are carried out under comparable conditions and with mixed starting materials of comparable compositions, although it should be appreciated that the invention is not limited to these compositions and conditions.

In each case the starting material was a mixture of three parts of completely polymerised methyl methacrylate with one part of monomeric methyl methacrylate. 1% of the above-mentioned di-(p-toluene-sulphonmethyl)-methylamine was added to the polymer as catalyst. The monomeric methyl methacrylate contained an addition of 0.006% of hydroquinone and also in general an addition of 5% of methanol. If the same quantity of ethanol is used instead of methanol then the polymerisation times are generally increased by about two minutes. With certain substances on the other hand, such as ethylene chloride, the addition of an alcohol can be omitted altogether. The experiments were carried out side by side with an addition of two gamma of copper in the form of cupric chloride per cc. of monomeric liquid and without the above-mentioned addition. In each case the proportion mentioned below of the corresponding halogen compound was added to the monomeric liquid, a proportion which corresponds in general to the optimum value in the examples under 1, 2 and 3.

The time was recorded between the introduction of the pearl polymer into the monomer, which was effected at a temperature of 22 to 24° C., and the completion of the polymerisation, which was observed by the substance becoming solid and the temperature falling. The highest temperature reached was also recorded and is the higher the quicker the polymerisation takes place.

Before setting out the individual experimental results, it should be observed that when a particularly fine grained and uniform polymer is used according to the above-given directions, polymerisation times are obtained which are approximately two minutes better than those given in the following examples.

*Example 1*

This relates to the addition of hydrogen halide acids.

| Substance | Formula | Proportion in gamma/cc. | Time in minutes | | Temperature maximum, ° C. |
|---|---|---|---|---|---|
| | | | Without addition of copper | With addition of copper | |
| Hydrochloric acid (aqueous) | HCl | 18–30 | 10–12 | 8–10 | 58 |
| Hydrobromic acid (aqueous) | HBr | 30 | 12–14 | 10 | 55 |
| Hydriodic acid (aqueous) | HI | 30 | | 20 | 33 |

*Example 2*

The following results refer to the addition of inorganic halides.

| Substance | Formula | Proportion in gamma/cc. | Time in minutes | | Temperature maximum, ° C. |
|---|---|---|---|---|---|
| | | | without addition of copper | with addition of copper | |
| Nickel chloride | NiCl₂.6H₂O | 80–320 | 13.5 | 10 | 48 |
| | | 150 | 14 | 11 | 50 |
| Manganous chloride | MnCl₂ | }50 | 16 | | 59 |
| Antimony chloride | SbCl₃ | | | 18 | 38 |
| Cupric chloride | CuCl₂ | 2–4 | | 8.10 | 55 |
| Ferric chloride | FeCl₃ | 1 | 15 | | 45 |
| Strontium chloride | SrCl₂ | saturated solution | 12 | | 40 |
| Strontium bromide | SrBr₂ | 800 | 14 | | 50 |
| Sodium chloride | NaCl | saturated solution | | 10 | 30 |
| Lithium chloride | LiCl | do | 15 | | 40 |
| Lithium bromide | LiBr | 800 | 14 | | 50 |
| Ammonium bromide | NH₄Br | 500 | 13 | | 50 |
| Hydroxylamine chloride | NH₂OH.HCl | 300 | 10 | 8–9 | 55 |

Remarks: By way of exception the experiments with strontium chloride and ammonium bromide were carried out with the addition of 16% of methanol instead of with 5%.

Good results were also obtained with mixtures of various halides and also with mixtures of halides and hydrogen halide acids. For example a polymerisation time of 8 to 10 minutes and a maximum temperature of approximately 56° C. was obtained with an addition of 8 gamma of hydrochloric acid and 30 gamma of zinc chloride and the above-mentioned quantity of cupric chloride.

With alkaline earth, alkali metal and ammonium halides it was also found that substantially better polymerisation times were obtained when using a completely unstabilised monomer then when 0.006% of hydroquinone was added.

Example 3

The following results refer to hydrochlorides and hydrobromides of organic bases.

| Substance | Formula | Proportion in gamma/cc. | Time in minutes | | Temperature maximum, °C. |
|---|---|---|---|---|---|
| | | | without addition of copper | with addition of copper | |
| Hydrochlorides of: | | | | | |
| (a) aliphatic compounds— | | | | | |
| Monomethylamine | $H_2N.CH_3.HCl$ | 300 | 10 | 8 | 57 |
| Monobutylamine | $H_2N.C_4H_9.HCl$ | 400 | 9 | 7–9 | 58 |
| Dibutylamine | $HN(C_4H_9)_2.HCl$ | 500 | 9 | 7–9 | 57 |
| Tributylamine | $N(C_4H_9)_3.HCl$ | 500 | 9 | 7–9 | 57 |
| Monobutylamine (hydrobromide) | $H_2N.C_4H_9.HBr$ | 350 | 9.5 | 8–9 | 53 |
| Urea | $CO(NH_2)_2.HCl$ | 380 | 9 | | 58 |
| Dodecylisothiourea | $(C_{12}H_{25})-SC\diagup^{NH.HCl}_{\diagdown NH_2}$ | 800 | 10 | 8 | 55 |
| Isoamylisothiourea | $(C_5H_{11})-SC\diagup^{NH.HCl}_{\diagdown NH_2}$ | 375 | 8.5 | | 57 |
| (b) aromatic compounds— | | | | | |
| Diphenylamine | $NH(C_6H_5)_2.HCl$ | 200 | 8.5 | 7 | 66 |
| Dimethyl-p-toluidine | $H_3C.C_6H_4.N(CH_3)_2.HCl$ | 320 | 9 | 7 | 65 |
| p-Phenylenediamine | $H_2N.C_6H_4.NH_2.HCl$ | 500 | 13 | | 30 |
| p-Aminodimethylaniline | $H_2N.C_6H_4.N(CH_3)_2.HCl$ | 500 | 16 | | 55 |
| (c) heterocyclic compounds— | | | | | |
| Pyridine | $C_5H_5N.HCl$ | 130 | 10 | | 58 |
| p-Toluenesulphonmethyl-(α-pyridyl)-amine | $CH_3.C_6H_4.SO_2.CH_2.NH.C_5H_4N.HCl$ | approx. 500 | | 7.5 | 55 |

In this case it is not absolutely necessary that the hydrochlorides be of stoichiometric composition. One of the two components can be present in a small excess, for example in many cases the amine can be in excess so as to give a neutral or slightly basic reaction.

The monomeric liquids activated with the hydrochlorides have a good stability on storage. Most of the preparations show no reduction in the polymerisation velocity, even after standing for several weeks at 50° C.

It should also be observed that the aliphatic products especially remain colourless, even after storage for a long time in the presence of copper salt.

Thus, it is possible by using the hydrochlorides to produce products which not only have a high polymerisation velocity but also have other properties which are desirable in use, such as stability in storage and absence of colour.

Example 4

The results given below refer to substances which contain a halogen atom loosely bound to a carbon or sulphur atom.

| Substance | Formula | Proportion in gamma/cc. | Time in minutes | | Temperature maximum, °C. |
|---|---|---|---|---|---|
| | | | without addition of copper | with addition of copper | |
| Triphenylchlormethane | $Cl.C(C_6H_5)_3$ | 320 | 9 | | 55 |
| Ethylenechlorhydrin | $Cl.CH_2.CH_2.OH$ | circa 2,000 | 9 | 8 | 56 |
| Chlormethylacetate | $CH_3.CO.OCH_2Cl$ | do | 8 | 7–7.5 | 58 |
| Acetyl chloride | $CH_3.CO.Cl$ | 160 | 14 | 12 | 51 |
| Benzoyl chloride | $C_6H_5.CO.Cl$ | 300 | 14 | 12 | 42 |
| Benzenesulphochloride | $C_6H_5.SO_2.Cl$ | circa 50 mg | 10 | | 55 |
| p-Toluenesulphochloride | $H_3C.C_6H_4.SO_2.Cl$ | circa 30 mg | 9.5 | | 53 |

It is not certain how the last-mentioned individual substances come to act as activators for the polymerisation catalysts. It is possible in the case of some of these substances that the splitting off of hydrogen chloride in the presence of traces of water plays a role; the effectiveness of the sulphochlorides might also be associated with their power of precipitating iodine from a solution of potassium iodide in methanol or acetone.

As already mentioned, in order to illustrate the effect of the halogen compounds, the other additions and the conditions are kept the same in the above-given examples.

In particular, however, in place of a di-(p-toluene-sulphonmethyl)-methylamine, others of the above-mentioned aryl sulphonalkylamines can also be used with the same success. The corresponding purely aliphatic compounds, such as di-(amyl-sulphon-methyl)-methylamine of the formula $(C_5H_{11}-SO_2.CH_2)_2NCH_3$, have also proved satisfactory in these compositions. Further catalysts, such as per compounds or tertiary amines, may be present in certain cases in the above examples, but this is not necessary.

The halogen compounds containing a halogen atom which is not firmly bound have proved suitable in general as activators for polymerisation accelerators of the general formula $R-SO_2-CHR'-X$, in which R represents a hydrocarbon residue which may, if desired, be substituted, R' represents hydrogen or a hydrocarbon residue which may, if desired, be substituted, and X represents one of the groups $-NR', R''$ or $-OR'''$, in which R'' represents a hydrogen atom or an $-OH$ or $-NHR$ group or a hydrocarbon residue which may, if desired, be substituted, and R''' represents a hydrogen atom or an alkyl, aralkyl or acyl group.

By the addition according to the invention of halogen compounds containing halogen atoms which are not firmly bound, a considerable improvement is also obtained in combination with other sulphur-containing organic catalysts and also with numerous other polymerisation accelerators. Besides sulphinic acids mention may be made of the salts of sulphinic acids with organic bases, especially primary or secondary amines, which are considerably more stable than the sulphinic acids themselves, for example the dibutylamine salt of toluene-sulphinic acid, and have recently been proposed as polymerisation accelerators.

The process of the invention and the starting materials used for carrying out this process can be applied in the most varied fields and to manifold purposes. Depending upon the intended use, there may be added to the products before, during or after the polymerisation additional materials, for example the most varied fillers, such as carbon black, highly dispersed metal oxides such as zinc oxide, silicon oxide, aluminum oxide and other finely dispersed or surface-active substances, vulcanising agents, such as vulcanising accelerators, dyestuffs, pigments, loading agents, air-drying oils, softeners, stabilisers, capillary-acting substances and so on. The process of the invention is of value in the lacquer, adhesive and surface-coating industry and is also suitable for the production of trowelling masses, impregnating masses for materials of all kinds, for example woven fabrics, especially textiles, joint-sealing masses, pore-fillers for the production of bodies or claddings which must be resistant to chemical attack or to atmospheric influences, for electric insulations of all kinds, heat and sound insulators, modelling and impression receiving masses. By means of the process of the invention moulded bodies of various kinds can be produced. Since the new polymerisation products can be produced free from pores and stress, they can in particular be used with advantage for the production of articles where optical clearness or transparency is necessary, such as safety glass, protective filters and spectacle lenses. The moulded bodies can be produced by the process of the invention in the most varied forms, such as threads, films, tubes, hoses, balls and bodies of complicated shape.

As already mentioned, the process of the invention is of particular importance in the field of dental technique, for example for the production of protheses such as palate plates, gum shields, artificial teeth, crowns, bridges, fixings and lower linings, as well as for the correction and repair of protheses, for which purpose the technician selects from the above-mentioned substances those which are physiologically suitable for dental purposes. Because the hardening time is considerably shortened the process is of importance in prothetic work in the mouth itself and for tooth and root fillings. The process of the invention can be applied with advantage in similar manner to other prothetic fields outside the dental field.

What we claim is:

1. In a method for the production of polymerization products, including molded bodies from polymerizable organic compounds having a terminal carbon-carbon double bond, in the presence of a polymerization activator, having the general formula

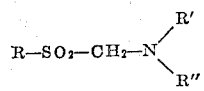

in which R is a hydrocarbon radical, R' is a hydrocarbon radical, and R" is a member selected from the group consisting of hydrocarbon radicals and the group $R-SO_2-CH_2-$, the improvement which comprises effecting the polymerization in the additional presence of a halogen compound selected from the group consisting of hydrogen halides of bromine, chlorine, and iodine, inorganic and organic ionizable salts of said hydrogen halides, triphenyl chlor-methane, ethylenechlorhydrin, chlor-methyl acetate, acetyl chloride, benzoyl chloride, benzine sulfochloride and p-toluene sulfochloride said halogen compound being used in an amount smaller than the amount of said polymerization activator.

2. Improvement according to claim 1, in which said halogen compound is present in a proportion of a few gamma to a few hundred gamma per cubic centimeter of a material to be polymerized.

3. Improvement according to claim 1, in which said halogen compound is hydrochloric acid.

4. Improvement according to claim 1, in which said halogen compound is a hydrochloric acid salt.

5. Improvement according to claim 1, in which said polymerization is additionally effected in the presence of an alcohol.

6. Improvement according to claim 1, in which said polymerization is effected in the additional presence of a small quantity of a heavy metal salt.

References Cited in the file of this patent

UNITED STATES PATENTS

| | | |
|---|---|---|
| 2,380,476 | Stewart | July 31, 1945 |
| 2,473,005 | Britton et al. | June 14, 1949 |
| 2,529,315 | Serniuk | Nov. 7, 1950 |
| 2,560,694 | Howard | July 17, 1951 |
| 2,558,139 | Knock et al. | June 26, 1951 |
| 2,569,480 | Lorand | Oct. 2, 1951 |
| 2,569,767 | Knock | Oct. 2, 1951 |
| 2,584,773 | Reynolds et al. | Feb. 5, 1952 |